Aug. 12, 1958  R. HENNECKE  2,847,250
DEVICE FOR BALANCING VEHICLE ROAD WHEELS
Filed April 11, 1955
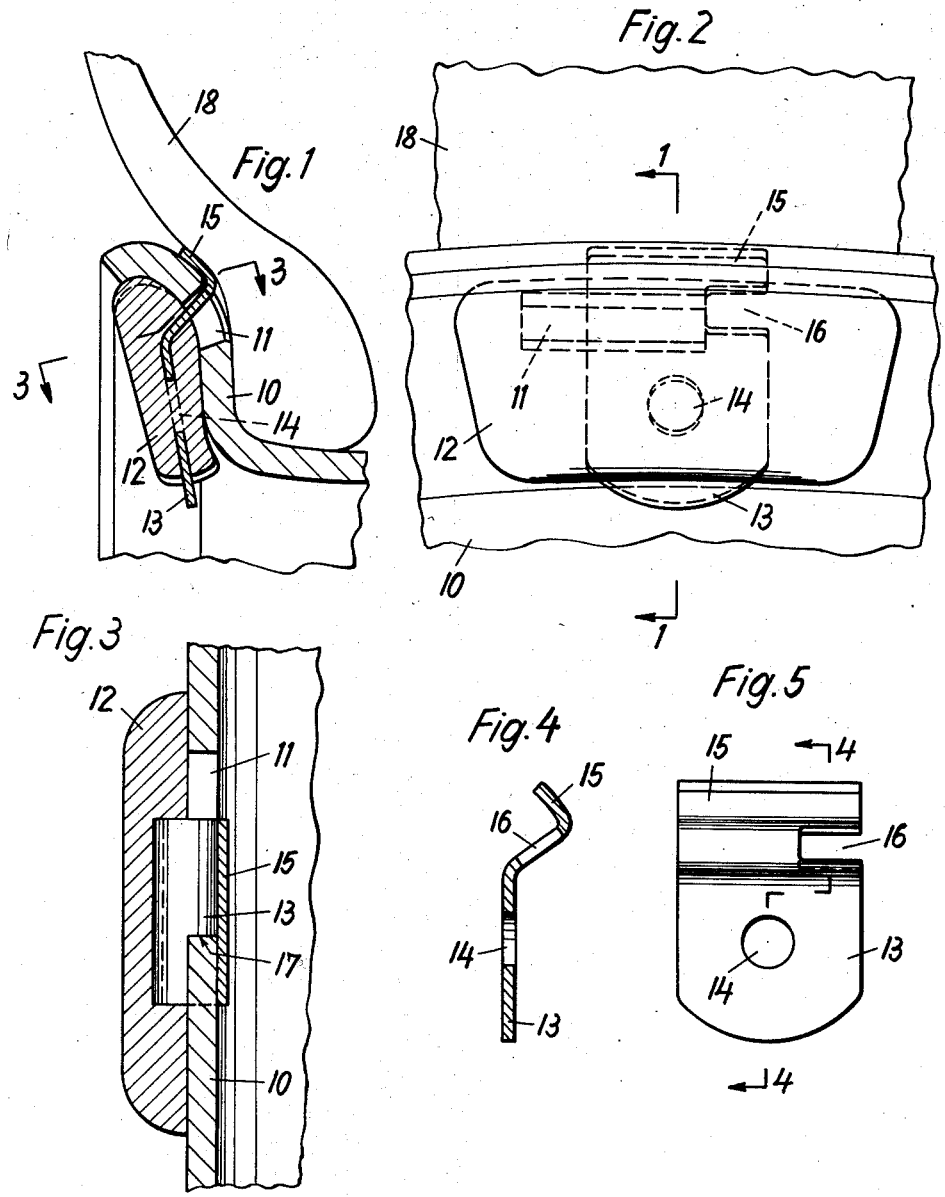
INVENTOR
RUDOLF HENNECKE
BY
ATTORNEYS.

United States Patent Office 2,847,250
Patented Aug. 12, 1958

2,847,250

DEVICE FOR BALANCING VEHICLE ROAD WHEELS

Rudolf Hennecke, Esslingen (Neckar), Germany, assignor to Daimler-Benz Aktiengesellschaft, Stuttgart-Unterturkheim, Germany Application April 11, 1955, Serial No. 500,525

Claims priority, application Germany April 15, 1954

3 Claims. (Cl. 301—5)

This invention has as one of its objects a simple, easy and yet dependable method of securing balancing devices for eliminating unbalance in vehicle road wheels.

Another object of the present invention is to provide a method of fastening the balancing weights whereby said weights can be suspended on the wheel rim through openings therein by appropriate shaping of said weights so that they can be coupled with the rim and thereby be secured against loosening, this method of fastening being when necessary provided in addition to the securing of the weights by means of the tire mounted on the rim.

Another object of the present invention is a construction of the balancing weight and its holder which ensures a rigid, positive connection between weight and holder at a low manufacturing cost.

Other objects and features of the present invention will become apparent from the following description and appended claims and the accompanying drawings which show an embodiment of the invention in which:

Fig. 1 is a cross sectional view of the balancing weight and rim, as taken on the line 1—1 of Fig. 2;

Fig. 2 is an end view of the arrangement according to Fig. 1;

Fig. 3 is a substantially horizontal section as taken on the line 3—3 of Fig. 1;

Fig. 4 is a cross section through the holder of the balancing weight as taken on the line 4—4 of Fig. 5; and Fig. 5 is an elevational view of the holder.

The rim 10 has a slot-shaped opening 11 therein which serves to suspend the balancing weight assembly. The latter consists of the balancing weight 12 proper made, for instance, of lead and which corresponds in length to the amount of weight to be balanced, and of the holder 13 which is anchored to the balancing weight 12 by filling a previously drilled hole 14 in the holder with weight material when casting the weight. The holder is hooked up on the rim edge by means of a hook-shaped lug 15 inserted through the slot 11 whereby the holder firmly presses the weight 12 against the rim edge from the inside. The arrangement is so devised that under the effect of centrifugal force the balance weight will bear even more firmly against the rim edge. The holder 13 according to the invention has, within the area of its angularly bent portion inserted through the rim, a lateral recess 16 which is dimensioned to correspond to the wall thickness of the rim 10 and is in alignment with the rim wall. Consequently, after passing the holder through the slot-shaped openings 11 in the rim the balancing weight can be moved in the direction of the circumference of the rim so that the edge 17 of the rim opening 11 engages the recess 16 in the holder as shown in Figs. 2 and 3, whereby an additional safeguard is provided against the loosening of the balancing weight held by the tire 18.

What I claim is:

1. A device for balancing vehicle road wheels provided with a rim and an opening therein for attaching a balancing weight assembly, comprising a balancing weight, a holder fastened thereto and adapted to be inserted through said opening, a recess in said holder disposed in the direction of the circumference of said rim with said weight bearing against said rim to enable tangential movement of said holder relative to said rim past a lateral edge of said opening and to thereby bring said recess into engagement with the rim wall upon such tangential movement of said holder, whereby said balancing weight assembly is securely fastened to said rim.

2. A device as claimed in claim 1, wherein said holder is angularly bent and wherein the bent end of said holder extends substantially parallel to a surface of said rim, in such a manner that with said weight attached to said rim said weight rests against said rim wall on both sides of an edge of said rim opening from the inside and said bent end of the holder will rest thereagainst from the outside, and wherein, further, said recess extends approximately parallel to said bent holder end.

3. A device as claimed in claim 1, wherein said weight consists of a cast body and said holder is cast into said cast body and has openings therein within said cast body which are filled with casting material from the weight.

References Cited in the file of this patent

UNITED STATES PATENTS

| 2,177,861 | Burger | Oct. 31, 1939 |
| 2,470,559 | Horn | May 17, 1949 |

FOREIGN PATENTS

| 1,057,156 | France | Oct. 28, 1953 |